(12) United States Patent
Kim et al.

(10) Patent No.: US 12,510,968 B2
(45) Date of Patent: Dec. 30, 2025

(54) TACTILE ULTRASONIC DEVICE AND METHOD FOR PROCESSING A USER INPUT USING THE SAME

(71) Applicants: HYUNDAI MOTOR COMPANY, Seoul (KR); KIA CORPORATION, Seoul (KR)

(72) Inventors: Dong Gu Kim, Suwon-si (KR); Hyun Soo Kim, Suwon-si (KR); Jang Hyeon Lee, Hwaseong-si (KR); Il Seon Yoo, Suwon-si (KR); Dae Sung Kwon, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 17 days.

(21) Appl. No.: 18/587,368

(22) Filed: Feb. 26, 2024

(65) Prior Publication Data

US 2025/0117087 A1    Apr. 10, 2025

(30) Foreign Application Priority Data

Oct. 10, 2023    (KR) .......................... 10-2023-0134472

(51) Int. Cl.
*G06F 3/01* (2006.01)
*B60K 35/25* (2024.01)

(52) U.S. Cl.
CPC .............. *G06F 3/016* (2013.01); *B60K 35/25* (2024.01); *G06F 3/017* (2013.01); *G06F 2203/014* (2013.01)

(58) Field of Classification Search
CPC .... G06F 3/016; G06F 3/017; G06F 2203/014; B60K 35/25
See application file for complete search history.

(56) References Cited

U.S. PATENT DOCUMENTS

| | | | |
|---|---|---|---|
| 10,268,275 B2* | 4/2019 | Carter | G06F 3/016 |
| 10,943,578 B2* | 3/2021 | Long | G10K 11/341 |
| 11,334,165 B1* | 5/2022 | Clements | B66B 1/468 |
| 2015/0002477 A1* | 1/2015 | Cheatham, III | G06F 3/016 345/177 |
| 2015/0180636 A1* | 6/2015 | Malladi | H04W 16/32 370/329 |

(Continued)

FOREIGN PATENT DOCUMENTS

KR    20250017385 A    2/2025

OTHER PUBLICATIONS

Seonghun Cho et al., Highperformance Ultrasonic Transducer Using Single-Crystal PMN-PZT for Mid-Air Haptic Feedback System in Vehicle, IEEE IUS 2023, published on Sep. 4, 2023, 6pp.

*Primary Examiner* — Ariel A Balaoing
(74) *Attorney, Agent, or Firm* — Lempia Summerfield Katz LLC

(57) ABSTRACT

A tactile ultrasonic device and a method of processing a user input by using the same. The tactile ultrasonic device may include a plurality of ultrasonic elements including a first ultrasonic element and a second ultrasonic element, which are placed such that beam axes are not parallel to each other. The tactile ultrasonic device may also include a processor that controls vibrations of the ultrasonic elements. A first focus of the first ultrasonic element and a second focus of the second ultrasonic element may be formed within a specific range of a tactile sensing area.

19 Claims, 17 Drawing Sheets

(56) References Cited

U.S. PATENT DOCUMENTS

| | | | |
|---|---|---|---|
| 2016/0180636 A1* | 6/2016 | David | G07F 17/3206 |
| | | | 463/32 |
| 2018/0004291 A1* | 1/2018 | Dauhajre | H04L 67/01 |
| 2018/0181203 A1* | 6/2018 | Subramanian | G01C 21/3652 |
| 2019/0196578 A1* | 6/2019 | Iodice | G06F 3/016 |
| 2019/0369731 A1* | 12/2019 | Verbeke | H04R 1/40 |
| 2020/0057501 A1* | 2/2020 | Lacroix | G06F 3/017 |
| 2020/0218354 A1* | 7/2020 | Beattie | G06T 7/41 |
| 2021/0162457 A1* | 6/2021 | Ebefors | G10K 15/00 |
| 2021/0294450 A1* | 9/2021 | Hattori | G06F 3/04883 |
| 2022/0164043 A1* | 5/2022 | Casset | B06B 1/0629 |
| 2022/0164079 A1* | 5/2022 | Marcolino Quintao Severgnini | G06F 3/016 |
| 2022/0326776 A1* | 10/2022 | Lee | G06F 3/04815 |
| 2023/0099288 A1* | 3/2023 | Wang | B06B 1/0625 |
| | | | 345/156 |
| 2024/0329741 A1* | 10/2024 | Kao | H04N 23/61 |
| 2025/0033471 A1 | 1/2025 | Kim et al. | |

\* cited by examiner

TACTILE ULTRASONIC DEVICE AND METHOD FOR PROCESSING A USER INPUT USING THE SAME

CROSS-REFERENCE TO RELATED APPLICATION

This application claims the benefit of and the priority to Korean Patent Application No. 10-2023-0134472, filed in the Korean Intellectual Property Office on Oct. 10, 2023, the entire contents of which are incorporated herein by reference.

TECHNICAL FIELD

The present disclosure relates to a tactile ultrasonic device and a method of processing a user input by using the same, and more specifically, to a technology for providing a user interface to an occupant of a vehicle by using tactile ultrasonic waves.

BACKGROUND

An audio-video-navigation (AVN) system for a vehicle refers to a multimedia system obtained by integrating audio, video, navigation, and telematics terminals into one. The AVN system may be also referred to a "head unit". The AVN system may output and control multimedia, such as audio, video, and navigation, through an AVN display installed on a dashboard of the vehicle, such as the instrument panel and center fascia of the vehicle.

Moreover, a central control panel (CCP) is used as another type of a control device of the AVN system on a center console to be conveniently operated by a driver.

Nowadays, research and use of future-oriented user interfaces are becoming more active. As a result, user interfaces that go beyond user input devices that sense physical external forces are emerging. For example, a technology is also being researched to display a user interface by using a holographic display and to recognize a gesture by using sensors, such as a camera.

As such, a motion gesture-based user interface may minimize a hardware input device. However, it is not easy for the motion gesture-based user interface to determine whether a user enters the desired action.

In particular, because a driver of the vehicle needs to look ahead, it is not easy for the driver of the vehicle to identify a hologram image and to determine a location of the user interface.

Accordingly, there is a demand for a user interface technology capable of increasing safety and convenience for a user of a vehicle. The above information disclosed in this Background section is provided only to enhance understanding of the background of the disclosure, and therefore it may contain information that does not form the prior art that is already known to a person of ordinary skill in the art.

SUMMARY

The present disclosure has been made to solve the above-mentioned problems occurring in the prior art while advantages achieved by the prior art are maintained intact.

An aspect of the present disclosure provides a tactile ultrasonic device that allows a user to easily identify an area of a user interface. The present disclosure also provides a method for processing a user input by using the same.

Moreover, an aspect of the present disclosure provides a tactile ultrasonic device that is capable of implementing a non-contact user interface while reducing the number of ultrasonic elements. The present disclosure also provides a method for processing a user input by using the same.

Furthermore, an aspect of the present disclosure provides a tactile ultrasonic device that allows a user to identify a user input entered by the user. The aspect of the present disclosure also provides a method for processing a user input by using the same.

Also, an aspect of the present disclosure provides a tactile ultrasonic device that is capable of notifying the user of event situations according to a vehicle state. The aspect of the present disclosure also provides a method for processing a user input by using the same.

The technical problems to be solved by the present disclosure are not limited to the aforementioned problems. Any other technical problems not mentioned herein should be clearly understood from the following description by those having ordinary skill in the art to which the present disclosure pertains.

According to an aspect of the present disclosure, a tactile ultrasonic device may include a plurality of ultrasonic elements including a first ultrasonic element and a second ultrasonic element. Beam axes of the first and second ultrasonic elements are not parallel to each other. The tactile ultrasonic device may also include a processor that controls vibrations of the plurality of ultrasonic elements. A first focus of the first ultrasonic element and a second focus of the second ultrasonic element may be formed within a specific range of a tactile sensing area.

According to an embodiment, an interval between the first ultrasonic element and the second ultrasonic element may be greater than a diameter of the tactile sensing area.

According to an embodiment, the first and second ultrasonic elements may be placed to transmit ultrasonic waves in an inside direction of a base plate. At least a partial area of the base plate is curved.

According to an embodiment, the base plate may be in a ring band shape having a cross section in a tapered shape.

According to an embodiment, the ultrasonic elements are arranged at regular intervals.

According to an embodiment, the ultrasonic elements are randomly arranged.

According to an embodiment, the ultrasonic elements may include: an arbitrary reference ultrasonic element; a first adjacent ultrasonic element adjacent to the arbitrary reference ultrasonic element; and a second adjacent ultrasonic element adjacent to the arbitrary reference ultrasonic element. An interval between the arbitrary reference ultrasonic element and the first adjacent ultrasonic element may be set to be different from an interval between the arbitrary reference ultrasonic element and the second adjacent ultrasonic element.

According to an embodiment, focal lengths of the ultrasonic elements may be the same as each other.

According to an embodiment, an interval between any pair of ultrasonic elements among the ultrasonic elements may be set to be smaller than a wavelength of each of the ultrasonic elements.

According to an embodiment, the tactile sensing area may include a first tactile sensing area and a second tactile sensing area, which are formed by time division.

According to an embodiment, the tactile ultrasonic device may further include a camera that captures an image of the tactile sensing area. The processor may determine a gesture of a user in the tactile sensing area based on the image of the tactile sensing area and may perform a predetermined specific function based on the gesture of the user.

According to an embodiment, the processor may perform the predetermined specific function differently based on an area where the gesture of the user is detected.

According to an embodiment, the processor may control vibrations of the ultrasonic elements such that sound pressure of the first tactile sensing area is different from sound pressure of the second tactile sensing area.

According to an embodiment, the processor may vibrate the ultrasonic elements based on a predetermined feedback vibration pattern to provide a notification that the predetermined specific function is performed, after performing the predetermined specific function.

According to an embodiment, the processor may perform the predetermined specific function based on the gesture of the user located in the first tactile sensing area. The processor may also control the ultrasonic elements such that the second tactile sensing area vibrates in a predetermined feedback vibration pattern, in response to performing the predetermined specific function.

According to an embodiment, the processor may perform the predetermined specific function based on the gesture of the user located in the first tactile sensing area. The processor may control the vibrations of the ultrasonic elements such that a predetermined warning vibration pattern is formed in the second tactile sensing area, in response to a warning event of a vehicle.

According to an aspect of the present disclosure, a method for processing a user input by using a tactile ultrasonic device may include outputting, by a plurality of ultrasonic elements including a first ultrasonic element and a second ultrasonic element arranged such that beam axes are not parallel to each other, predetermined sound pressure to a tactile sensing area having a diameter smaller than an interval between the first ultrasonic element and the second ultrasonic elements. The method also includes capturing, by a camera, an image of the tactile sensing area. The method also includes determining, by a processor, a gesture of a user in the tactile sensing area based on the image of the tactile sensing area. The method also includes performing, by the processor, a predetermined specific function based on the gesture of the user.

According to an embodiment, the tactile sensing area includes a first tactile sensing area and a second tactile sensing area, which are formed by time division. The outputting of the predetermined sound pressure to the tactile sensing area may include controlling the vibrations of the ultrasonic elements such that focuses of the ultrasonic elements are formed in the first tactile sensing area, during a first time period. The outputting of the predetermined sound pressure to the tactile sensing area may also include controlling the vibrations of the ultrasonic elements such that focuses of the ultrasonic elements are formed in the second tactile sensing area, during a second time period that does not overlap the first time period.

According to an embodiment, the performing of the predetermined specific function may further include determining the gesture of the user in only the first tactile sensing area. The performing of the predetermined specific function may further include controlling, by the processor, the vibrations of the ultrasonic elements such that a predetermined feedback vibration pattern is formed in the second tactile sensing area, in response to performing the predetermined specific function.

According to an embodiment, the performing of the predetermined specific function may further include determining the gesture of the user in only the first tactile sensing area. The performing of the predetermined specific function may further include controlling, by the processor, the vibrations of the ultrasonic elements such that a predetermined alarm vibration pattern is formed in the second tactile sensing area, in response to a warning event of a vehicle.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
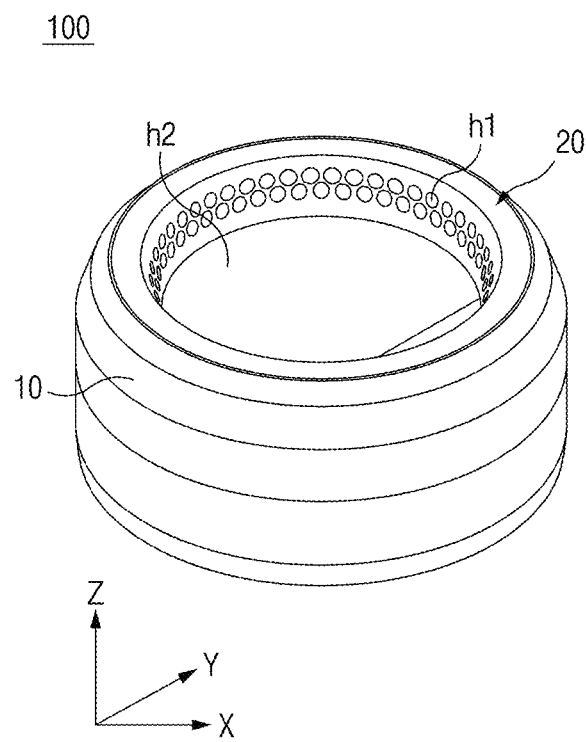
FIG. 1 is a perspective view showing a tactile ultrasonic device, according to an embodiment of the present disclosure.

Hereinafter, some embodiments of the present disclosure are described in detail with reference to the accompanying drawings. In adding reference numerals to components of each drawing, it should be noted that the same components have the same reference numerals, although the components are indicated on another drawing. Furthermore, in describing the embodiments of the present disclosure, detailed descriptions associated with well-known functions or configurations have been omitted when the detailed descriptions may make subject matters of the present disclosure unnecessarily obscure.

In describing elements of an embodiment of the present disclosure, the terms first, second, A, B, (a), (b), and the like may be used herein. These terms are only used to distinguish one element from another element and do not limit the corresponding elements irrespective of the nature, order, or priority of the corresponding elements. Furthermore, unless otherwise defined, all terms including technical and scientific terms used herein are to be interpreted as is customary in the art to which the present disclosure belongs. It should be understood that terms used herein should be interpreted as having a meaning that is consistent with their meaning in the context of the present disclosure and the relevant art. The terms should not be interpreted in an idealized or overly formal sense unless expressly so defined herein. When a component, device, element, or the like of the present disclosure is described as having a purpose or performing an operation, function, or the like, the component, device, element, or the like should be considered herein as being "configured to" meet that purpose or to perform that operation or function. Each of the component, device, element, and the like may separately embody or be included with a processor and a memory, such as a non-transitory computer readable media, as part of the apparatus.

Hereinafter, various embodiments of the present disclosure are described in detail with reference to FIGS. 1-16.

Figure 2:
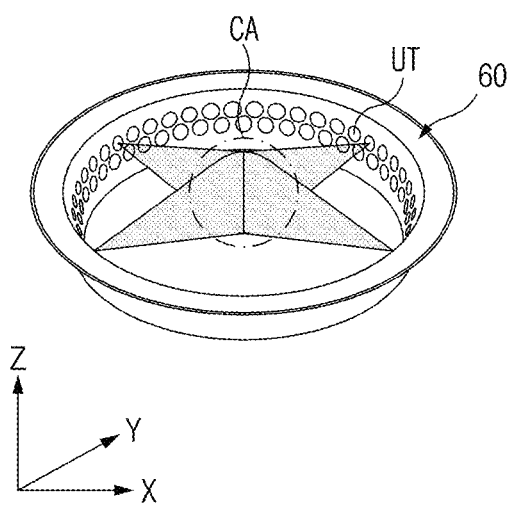
FIG. 2 is a diagram showing the arrangement of ultrasonic elements, according to an embodiment of the present disclosure.
Figure 3:
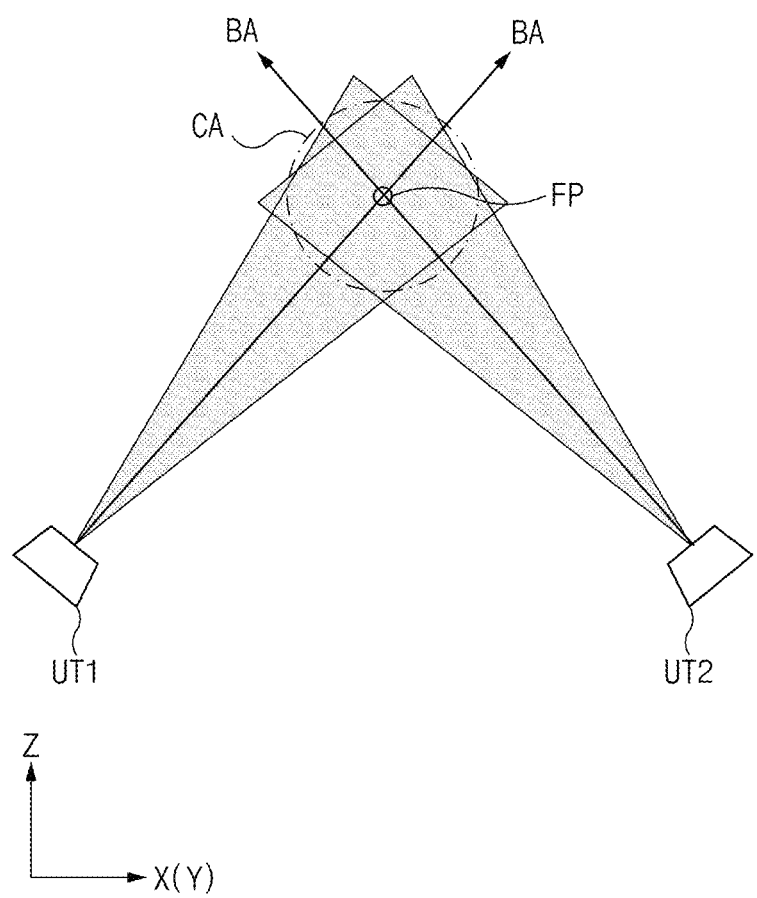
FIG. 3 is a diagram for describing a tactile generation area, according to an embodiment of the present disclosure.

FIG. 1 is a perspective view showing a tactile ultrasonic device, according to an embodiment of the present disclosure. FIG. 2 is a diagram showing the arrangement of ultrasonic elements, according to an embodiment of the present disclosure. FIG. 3 is a diagram for describing a tactile generation area, according to an embodiment of the present disclosure.

Referring to FIGS. 1-3, a tactile ultrasonic device 100 according to an embodiment of the present disclosure may include a case 10, a base plate 20, and ultrasonic elements UT.

The case 10 may provide space for accommodating a main configuration of the tactile ultrasonic device 100 and may protect the ultrasonic elements UT from physical shock. The case 10 may be cylindrical or ring-shaped.

The base plate 20 may be used to determine locations of the ultrasonic elements UT, and the ultrasonic elements UT may be coupled to the base plate 20. Alternatively, the ultrasonic elements UT may be coupled to another structure, such as the case 10. At least part of the area of the ultrasonic elements UT may be inserted into a hole h1 of the base plate 20 to fix locations of the ultrasonic elements UT.

The base plate 20 may have at least part of areas formed as a curved surface. For example, the base plate 20 may be formed into a ring band shape. The base plate 20 having a ring band shape may be formed into a circular ring shape such that a hole h2 is formed therein on a XY plane. Moreover, the base plate 20 may have a tapered shape on a XZ plane, which is perpendicular to the XY plane.

An inner surface of the base plate 20 facing the hole h2 may be a curved surface having a curvature on the XZ plane. Therefore, beam axes of the ultrasonic elements UT placed at different locations in a Z axis may be focused on one point in the XZ plane.

The ultrasonic elements UT may output ultrasonic waves centered on a beam axis BA. Each of the ultrasonic elements UT may be an oscillator that generates ultrasonic waves by vibration and may be classified into a magnetostrictive oscillator or a piezoelectric oscillator based on the principle of vibration generation.

The ultrasonic element UT having a magnetostrictive oscillator type may use a coil wound around a magnetic material such as ferrite. A magnetostrictive oscillator may resonate at a natural frequency based on the applied current to generate ultrasonic waves in a direction perpendicular to a magnetic field.

The ultrasonic element UT having a piezoelectric oscillator type may have a simple structure by using the piezoelectric effect that mechanical stress is converted into electric charge. The piezoelectric material may generate a longitudinal wave or shear wave depending on the cut shape and may repeat expansion and contraction by polarizing the piezoelectric material and then applying an alternating voltage. A piezoelectric oscillator may output ultrasonic waves based on the vibration of the piezoelectric material.

Beam axes of at least two or more ultrasonic elements UT (e.g., a first ultrasonic element UT1 and a second ultrasonic element UT2) among the ultrasonic elements UT may not be parallel to each other. For example, the beam axes of the first ultrasonic element UT1 and a beam axis of the second ultrasonic element UT2 may be positioned such that a focus is formed within a tactile sensing area CA. In particular, the first ultrasonic element UT1 and the second ultrasonic element UT2 may be placed such that each focus is formed within the tactile sensing area CA.

FIG. 3 shows the first ultrasonic element UT1 and the second ultrasonic element UT2. However, the plurality of ultrasonic elements UT may be placed such that each focus is formed on the tactile sensing area CA.

Furthermore, an interval between a pair of the ultrasonic elements UT, which have the greatest separation distance, from among the ultrasonic elements UT may be set to be greater than a diameter of the tactile sensing area CA. In other words, a plurality of the ultrasonic elements UT may be placed such that a focus is concentrated toward an area smaller than an area of the tactile ultrasonic device 100.

Because ultrasonic waves from a plurality of the ultrasonic elements UT are overlapped with each other, the tactile sensing area CA may be an area where sound pressure is formed at a level at which a user is capable of feeling the tactile sense. For example, the tactile sensing area CA may have sound pressure level set to 155 dB SPL.

Figure 4:
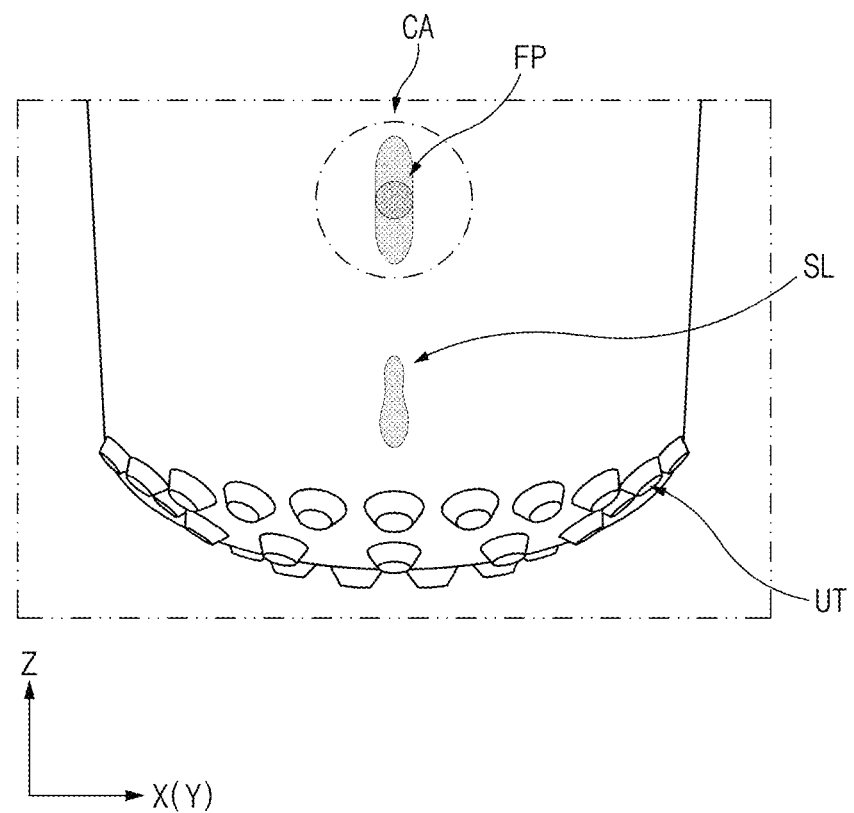
FIG. 4 is a diagram for describing the improvement of a sidelobe based on an embodiment of the present disclosure.

FIG. 4 is a diagram for describing the improvement of a sidelobe based on an embodiment of the present disclosure.

Referring to FIG. 4, the ultrasonic elements UT according to an embodiment of the present disclosure are focused toward the tactile sensing area CA, and thus only a sidelobe SL in a vertical direction (Z-axis direction) remains somewhat. It may be seen that sidelobes in a horizontal direction (X-axis direction or Y-axis direction) have almost disappeared.

As such, according to an embodiment of the present disclosure, because focuses of the ultrasonic elements UT are concentrated to generate the tactile sensing area CA, the desired level of sound pressure may be achieved while the number of the ultrasonic elements UT is reduced.

Figure 5A:
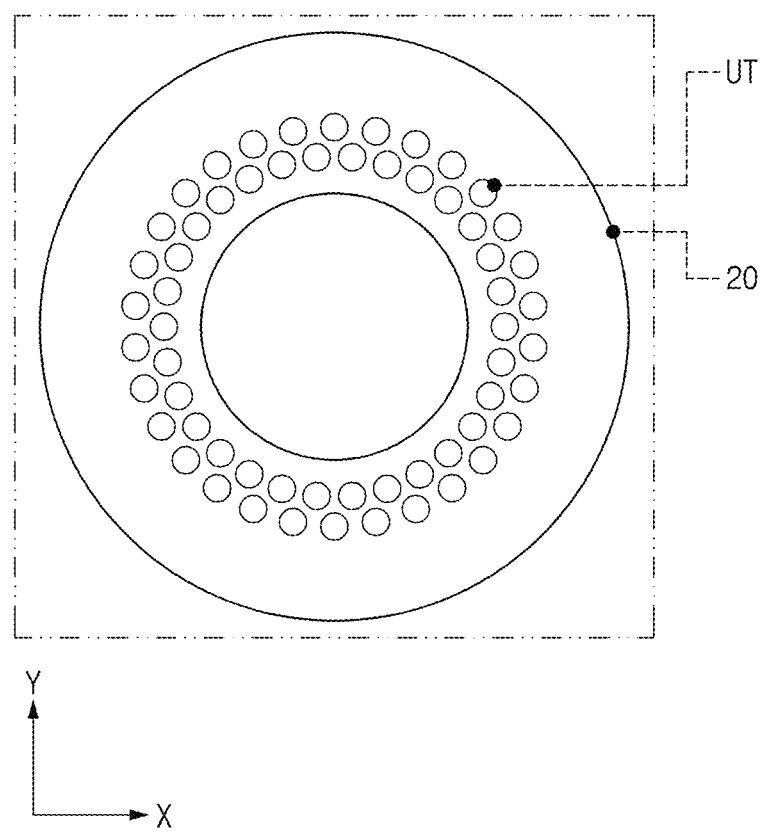
FIGS. 5A and 5B are diagrams showing the arrangement of ultrasonic elements, according to an embodiment of the present disclosure.
Figure 5B:
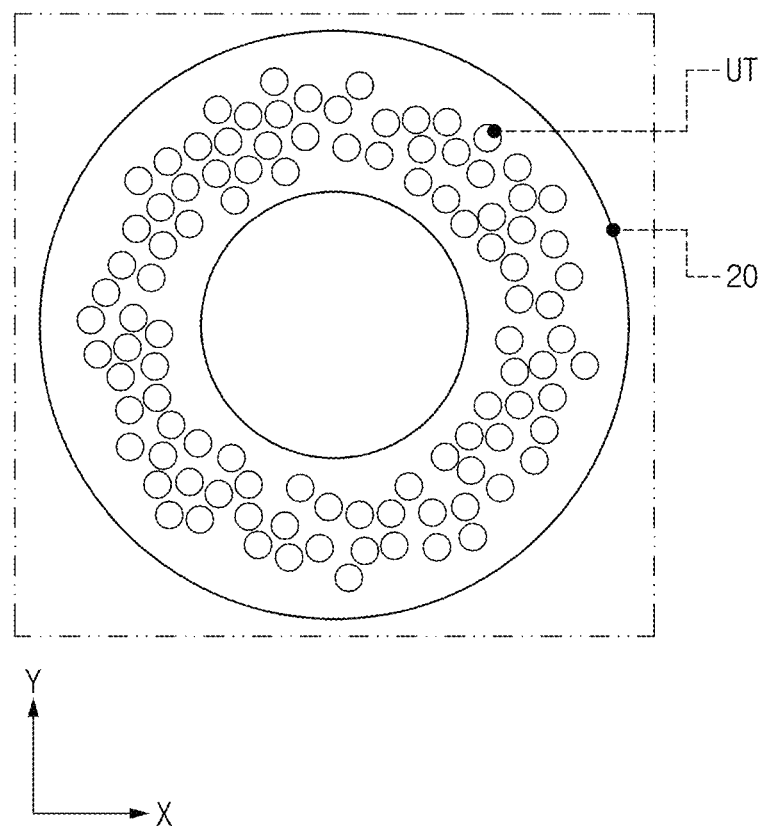

FIGS. 5A and 5B are diagrams showing the arrangement of ultrasonic elements, according to an embodiment of the present disclosure.

FIG. 5A is a diagram showing the arrangement of ultrasonic elements according to the first embodiment. FIG. 5B is a diagram showing the arrangement of ultrasonic elements according to the second embodiment.

Referring to FIG. 5A, the ultrasonic elements UT according to the first embodiment may be arranged at regular intervals.

For example, the ultrasonic elements UT according to the first embodiment may be positioned in a form having a plurality of concentric circles. FIG. 5A shows the ultrasonic elements UT having two concentric circles.

Moreover, an interval between the ultrasonic elements UT adjacent to each other in the ultrasonic elements UT placed in the same concentric circle may be set to be the same as each other.

Furthermore, an interval between the ultrasonic elements UT placed in one concentric circle may be the same as an interval between the ultrasonic elements UT placed in another concentric circle.

Also, intervals between concentric circles may be the same as each other.

Referring to FIG. 5B, the ultrasonic elements UT according to the second embodiment may be randomly arranged. The ultrasonic elements UT according to the second embodiment may not have any regularity in interval and arrangement form.

For example, an interval between a reference ultrasonic element UTr and a first ultrasonic element adjacent thereto may be different from an interval between the reference ultrasonic element UTr and a second ultrasonic element adjacent thereto. This is described with reference to FIG. 6 as follows.

Figure 6:
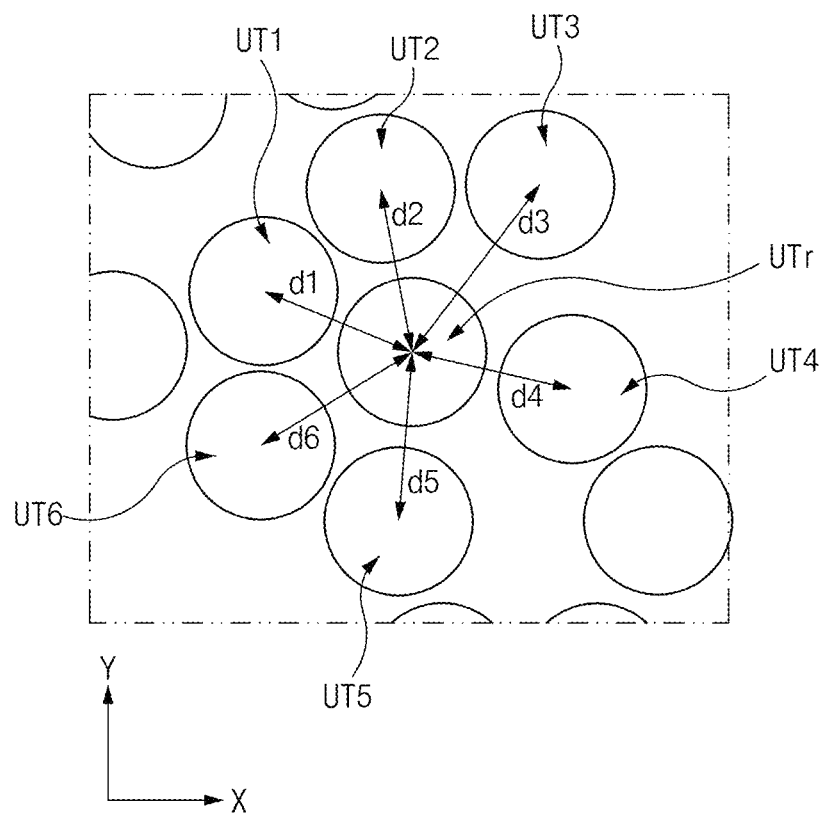
FIG. 6 is a diagram for describing an interval form of ultrasonic elements according to the second embodiment.

FIG. 6 is a diagram for describing an interval form of ultrasonic elements according to the second embodiment.

Referring to FIG. 6, the ultrasonic elements according to the second embodiment may have different intervals between the reference ultrasonic element UTr and the ultrasonic elements UT adjacent thereto. In FIG. 6, the reference ultrasonic element UTr may be randomly selected. First to sixth ultrasonic elements UT1 to UT6 may be adjacent to the reference ultrasonic element UTr.

d1 may denote an interval between the reference ultrasonic element UTr and the first ultrasonic element UT1. d2 may denote an interval between the reference ultrasonic element UTr and the second ultrasonic element UT2. d3 may denote an interval between the reference ultrasonic element UTr and the third ultrasonic element UT3. d4 may denote an interval between the reference ultrasonic element UTr and the fourth ultrasonic element UT4. d5 may denote an interval between the reference ultrasonic element UTr and the fifth ultrasonic element UT5. d6 may denote an interval between the reference ultrasonic element UTr and the sixth ultrasonic element UT6.

In the ultrasonic elements according to the second embodiment, at least one of d1, d2, d3, d4, d5, or d6 may be set differently. In an embodiment, all of d1 to d6 may be set differently from one another.

Figure 7:
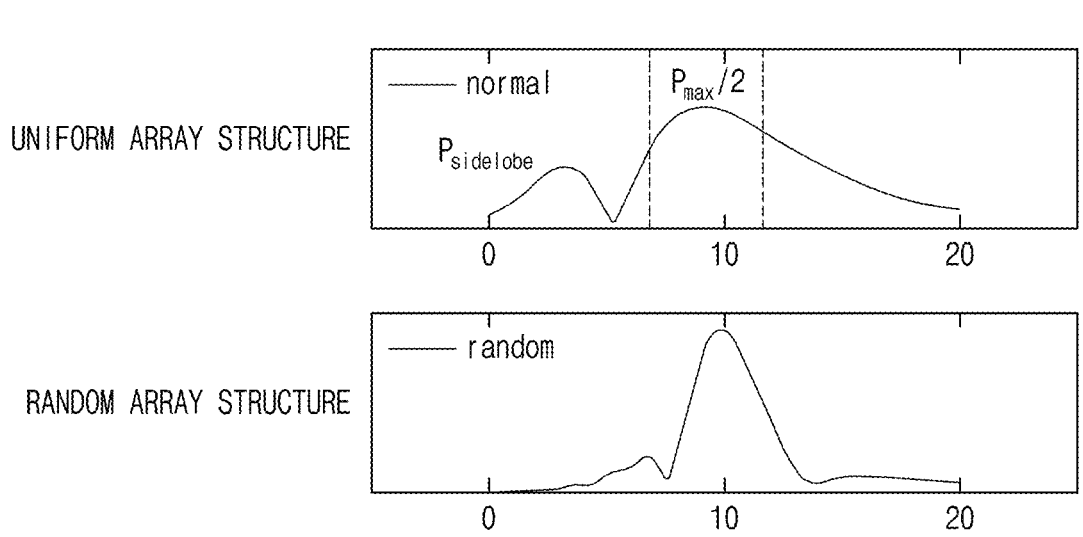
FIG. 7 is a diagram showing output characteristics of ultrasonic elements according to an arrangement state of ultrasonic elements.

FIG. 7 is a diagram showing output characteristics of ultrasonic elements according to an arrangement state of ultrasonic elements. In FIG. 7, a uniform array structure may refer to the arrangement of ultrasonic elements according to the first embodiment shown in FIG. 5A. A random array structure may refer to the arrangement of ultrasonic elements according to the second embodiment shown in FIG. 5B.

Referring to FIG. 7, output characteristics of the ultrasonic elements UT may be determined based on a vertical length of an ultrasonic mainlobe and a vertical length of an ultrasonic sidelobe. The vertical length may mean a length in a Z-axis direction. $P_{max}$ may mean the vertical length of the main lobe. $P_{sidelobe}$ may mean the vertical length of the sidelobe. As focuses of the ultrasonic elements UT are concentrated on a smaller area, the vertical length of each of the mainlobe and the sidelobe may decrease.

As illustrated in FIG. 7, it may be seen that the focuses of the ultrasonic elements UT are concentrated on a small area when the ultrasonic elements UT are placed in a random array structure compared to a case that the ultrasonic elements UT are placed in a uniform array structure.

Moreover, an interval between a pair of the ultrasonic elements UT among the ultrasonic elements UT may be set to be smaller than the wavelength of an ultrasonic element. When an interval between the ultrasonic elements UT is greater than the wavelength of the ultrasonic element, the sidelobe may be generated to be great due to sidelobes of the plurality of ultrasonic elements UT. On the other hand, according to an embodiment of the present disclosure, the sidelobe may be further reduced by setting the interval between the ultrasonic elements UT to be smaller than the wavelength of the ultrasonic element.

Figure 8:
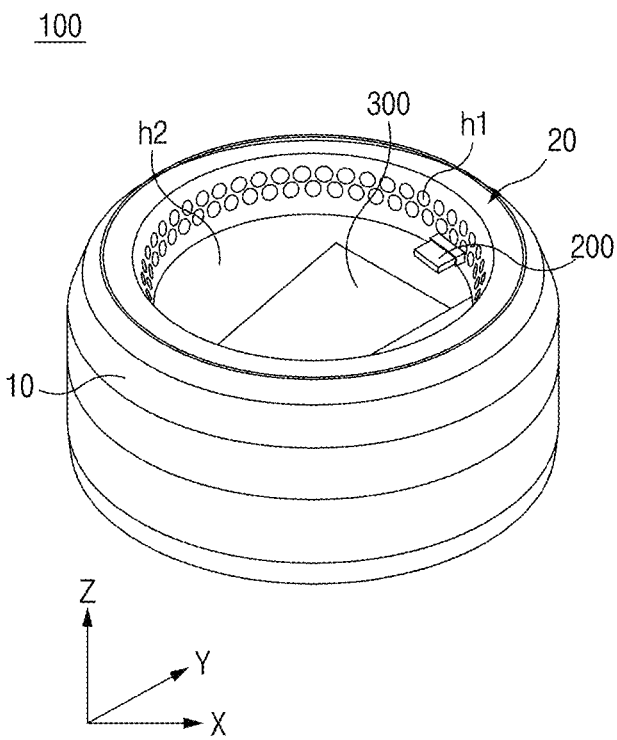
FIG. 8 is a diagram showing a tactile ultrasonic device according to another embodiment of the present disclosure.
Figure 9:
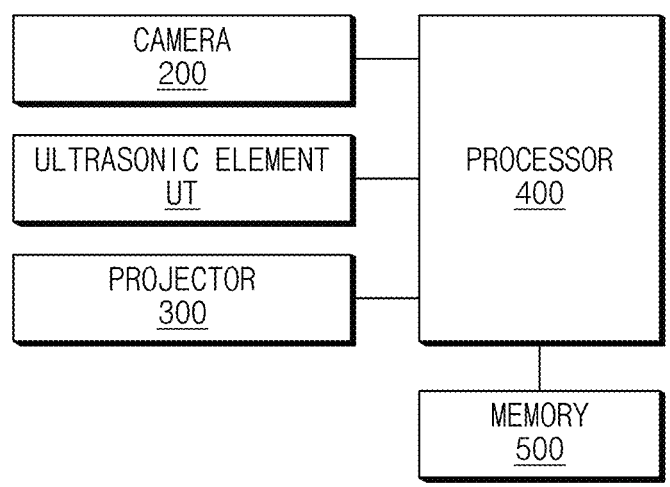
FIG. 9 is a block diagram showing a configuration of a tactile ultrasonic device according to another embodiment of the present disclosure.
Figure 10:
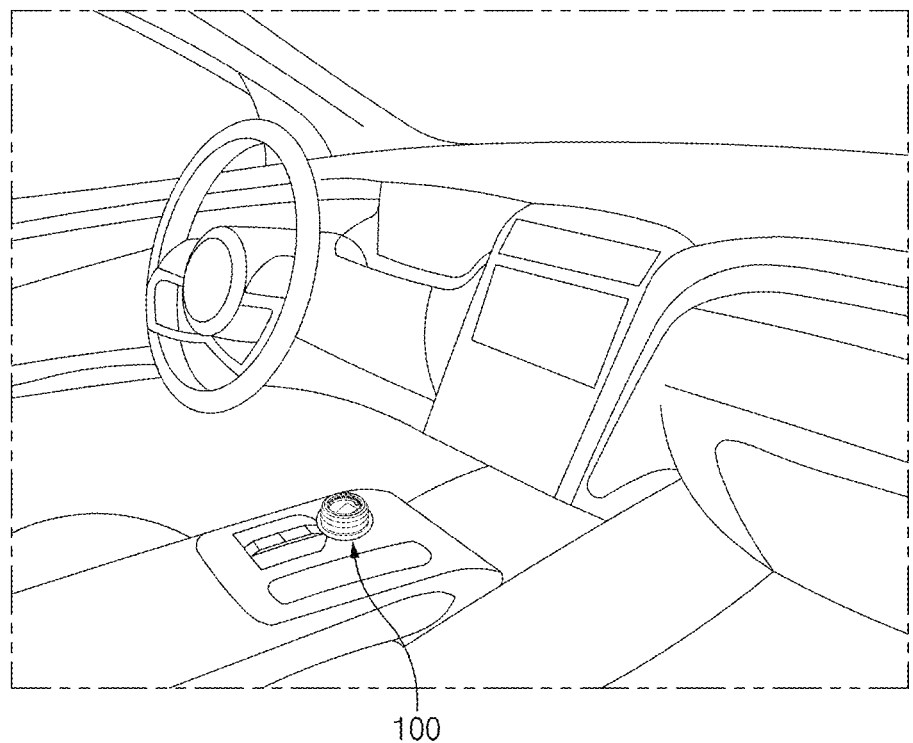
FIGS. 10 and 11 are diagrams for describing an example, in which a tactile ultrasonic device is mounted on a vehicle, according to an embodiment of the present disclosure.
Figure 11:
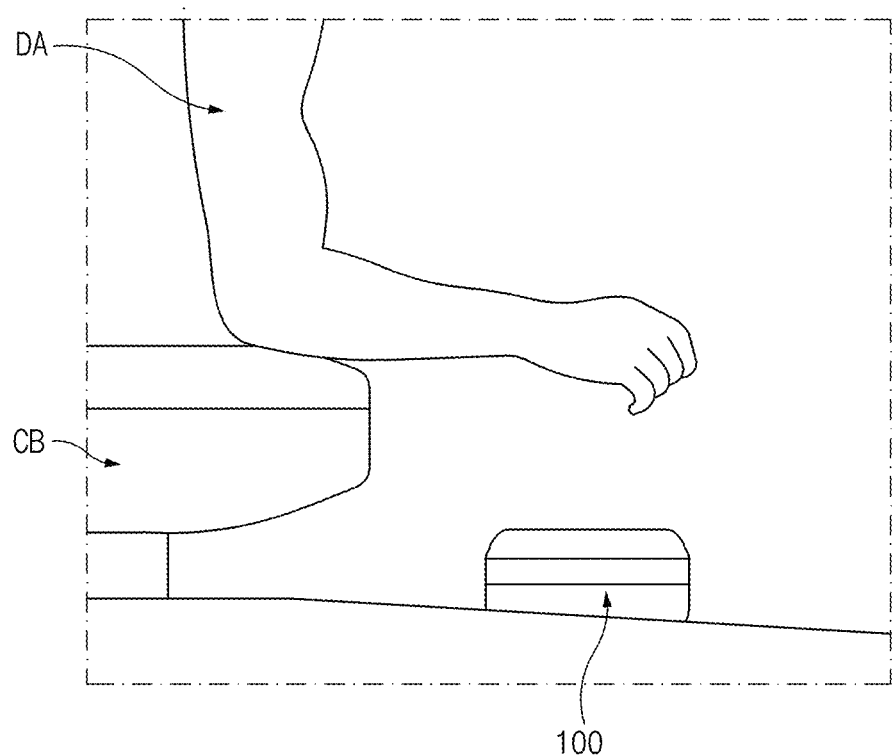

FIG. 8 is a diagram showing a tactile ultrasonic device according to another embodiment of the present disclosure. FIG. 9 is a block diagram showing a configuration of a tactile ultrasonic device according to another embodiment of the present disclosure. FIGS. 10 and 11 are diagrams for describing an example, in which a tactile ultrasonic device is mounted on a vehicle, according to an embodiment of the present disclosure.

Referring to FIGS. 8-11, the tactile ultrasonic device 100 according to another embodiment of the present disclosure may include the case 10, the base plate 20, the ultrasonic elements UT, a camera 200, a projector 300, a processor 400, and a memory 500. Hereinafter, detailed descriptions of configurations substantially the same as those of the above-described embodiment in the description of FIGS. 8 and 9 have been omitted to avoid redundancy.

The camera 200 may obtain an image by capturing the tactile sensing area CA. The camera 200 may be a 3D camera or a 2D camera. The camera 200 may obtain an image of the tactile sensing area CA at regular time intervals and may provide the image to the processor 400 in a video data format.

The projector 300 may be used to display a holographic image. An image projected from the projector 300 may be displayed as a holographic image via a lens 310 shown in FIG. 12. A method for displaying a holographic image may be implemented in various known embodiments.

The projector 300 may display an image corresponding to a user interface. For example, the projector 300 may express the type of a user input device by displaying a mouse shape in the tactile sensing area CA.

The processor 400 may determine a user's gesture in the tactile sensing area CA from the image obtained by the camera 200 and may perform specific functions depending on the user's gesture.

The processor 400 may use an AI processor to detect the user's body DA from the image. The AI processor may learn a neural network by using a pre-stored program. The neural network may be designed to simulate a human brain structure on a computer and may include a plurality of network nodes. Each of the plurality of network nodes has a weight, and the plurality of network nodes simulates neurons of a human neural network. The plurality of network modes may exchange data based on each connection relationship such that neurons simulate synaptic activity of neurons that exchange signals through synapses. The neural network may include a deep learning model developed from a neural network model. In the deep learning model, a plurality of network nodes may exchange data based on a convolution connection relationship while being located on different layers. Examples of neural network models may include various deep learning techniques, such as deep neural networks (DNN), convolutional deep neural networks (CNN), recurrent neural networks (RNN) restricted Boltzmann machine (RBM), deep belief networks (DBN), and deep Q-networks.

Besides, the processor 400 may obtain image coordinates from the image obtained by the camera 200 and may convert the image coordinates into coordinates in a world coordinate system. The world coordinate system may be used to express arbitrary point locations in actual physical space. In an embodiment of the present disclosure, an origin in the world coordinate system may be a point where a straight line perpendicular to a horizontal plane while passing through the center of a front bumper of a vehicle meets the horizontal plane.

The x-axis may be a reference axis indicating a forward direction of a vehicle. The y-axis may be named a horizontal axis indicating a direction perpendicular to a reference axis on the same plane as the x-axis. A XY plane may be named a horizontal plane parallel to a road surface. The z-axis is an axis perpendicular to the XY plane and may be an axis for expressing a height from the road surface.

The memory 500 may store an algorithm for an operation of the processor 400 and an AI processor. The memory 500 may use a hard disk drive, a flash memory, an electrically erasable programmable read-only memory (EEPROM), a static random access memory (SRAM), a ferro-electric RAM (FRAM), a phase-change RAM (PRAM), a magnetic RAM (MRAM), a dynamic RAM (DRAM), a synchronous DRAM (SDRAM), a double date rate-SDRAM (DDR-SDRAM), or the like.

Figure 12:
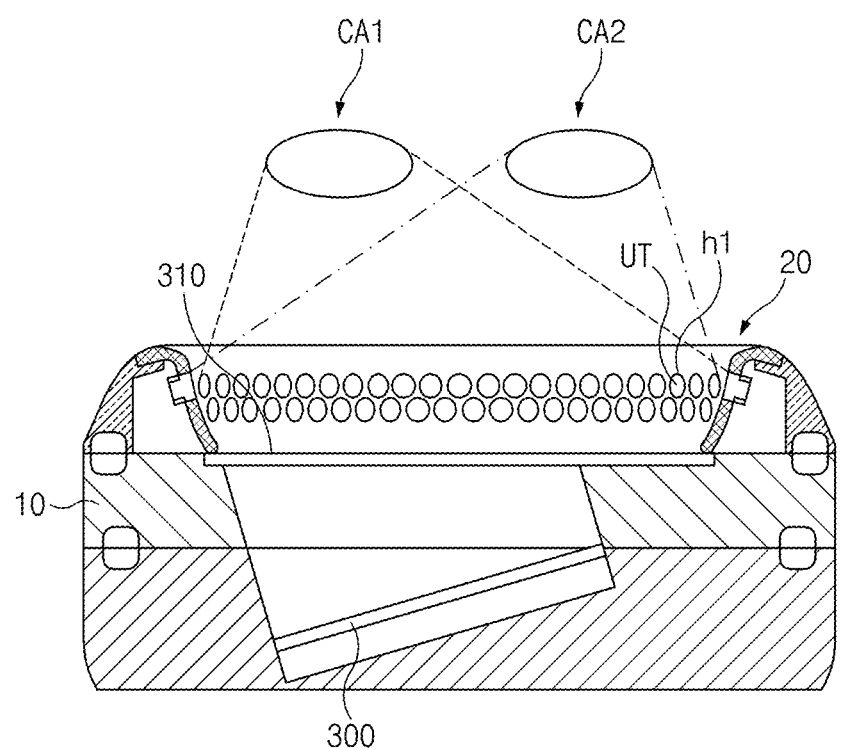
FIGS. 12 and 13 are diagrams for describing an embodiment of forming a tactile sensing area of a tactile ultrasonic device, according to another embodiment of the present disclosure.
Figure 13:
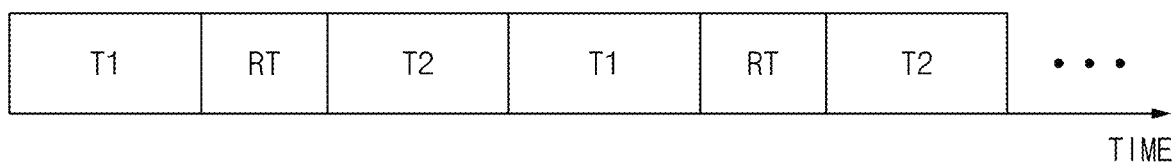

FIGS. 12 and 13 are diagrams for describing an embodiment of forming a tactile sensing area of a tactile ultrasonic device, according to another embodiment of the present disclosure.

Referring to FIGS. 12 and 13, the tactile sensing area CA may include the first tactile sensing area CA1 and the second tactile sensing area CA2. The first tactile sensing area CA1 and the second tactile sensing area CA2 may be formed by time division.

A location where the tactile sensing area CA is formed may be determined by the frequency of the ultrasonic elements UT. In other words, the processor 400 may determine the location, at which the tactile sensing area CA is formed, by controlling the frequency of the ultrasonic elements UT.

As illustrated in FIG. 13, the processor 400 may control the vibration of the ultrasonic elements UT such that the focus of the ultrasonic elements UT is formed in the first tactile sensing area CA1 during a first time period T1. The processor 400 may also control the vibration of the ultrasonic elements UT such that the focus of the ultrasonic elements UT is formed in the second tactile sensing area CA2 during a second time period T2.

A rest time period RT may occur between the first time period T1 and the second time period T2.

The processor 400 may control the vibration of the ultrasonic elements UT such that the sound pressure of the first tactile sensing area CA1 is different from the sound pressure of the second tactile sensing area CA2. Accordingly, while looking ahead, the user may identify an area where the user's hand is located.

Figure 14:
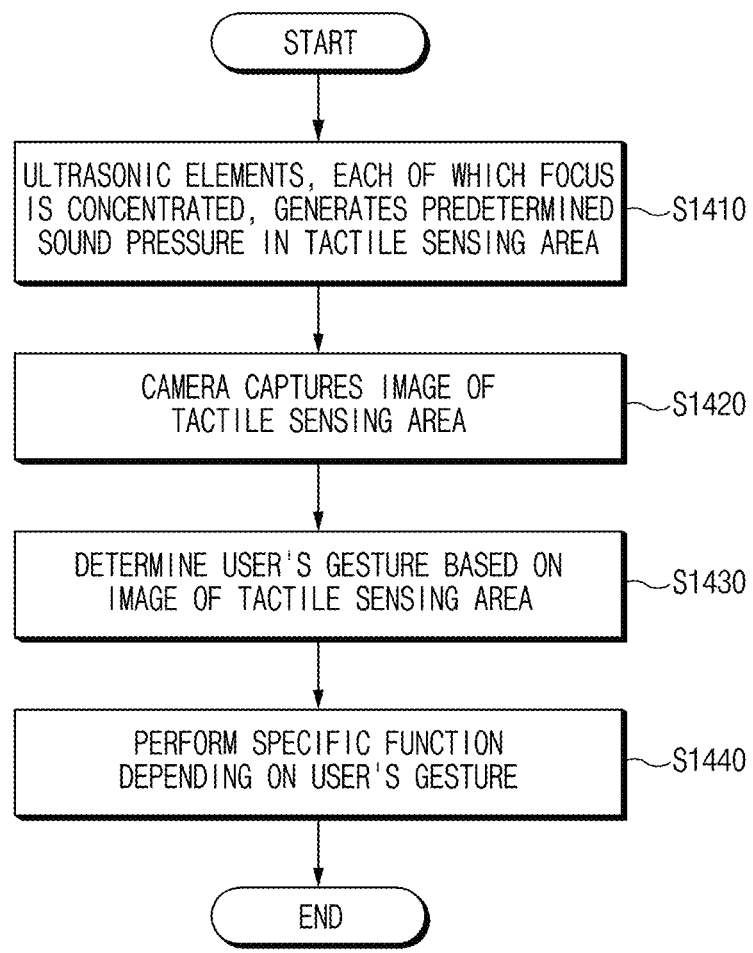
FIG. 14 is a flowchart for describing a user input processing method using a tactile ultrasonic device, according to an embodiment of the present disclosure.

FIG. 14 is a flowchart for describing a user input processing method using a tactile ultrasonic device, according to an embodiment of the present disclosure. An embodiment shown in FIG. 14 may be procedures controlled by the processor 400.

The user input processing method according to an embodiment of the present disclosure is described with reference to FIG. 14.

In S1410, the processor 400 may allow the ultrasonic elements UT to generate predetermined sound pressure in the tactile sensing area CA.

In S1420, the processor 400 may allow the camera 200 to capture an image of the tactile sensing area CA.

The tactile sensing area CA may be one. As illustrated in FIG. 12, the tactile sensing area CA may be divided into a plurality of tactile sensing areas including the first tactile sensing area CA1 and the second tactile sensing area CA2.

In S1430, the processor 400 may determine a user's gesture based on an image of the tactile sensing area.

To this end, the processor 400 may detect the user's body from the image of the tactile sensing area CA.

Moreover, the processor 400 may determine whether the user's body (e.g., a finger) is located in the first tactile sensing area CA1 or the second tactile sensing area CA2.

Furthermore, the processor 400 may determine an action executed by the user's body.

In S1440, the processor 400 may perform a specific function based on the user's gesture.

According to an embodiment, the processor 400 may control an audio-video-navigation (AVN) device of a vehicle based on the user's gesture. To this end, the processor 400 may display a user interface (UI) for controlling the AVN device on a display placed in a center fascia, and input icons. The processor 400 may control the input icon displayed on the UI based on the user's gesture.

Figure 15:
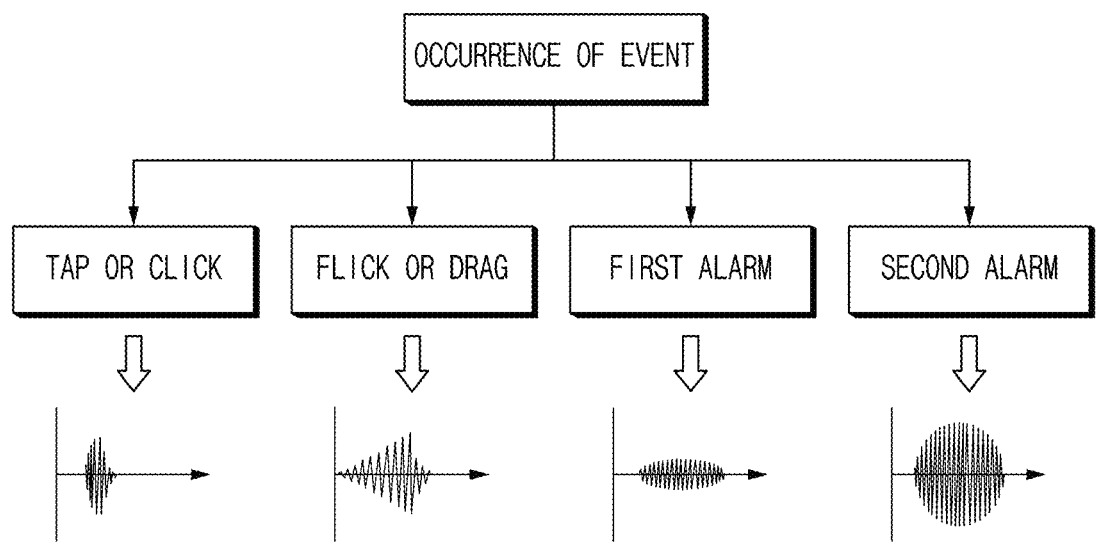
FIG. 15 is a diagram for describing an example of an ultrasonic pattern according to an event, according to an embodiment of the present disclosure.

FIG. 15 is a diagram for describing an example of an ultrasonic pattern according to an event, according to an embodiment of the present disclosure.

An example of an ultrasonic pattern corresponding to an event according to an embodiment of the present disclosure is described with reference to FIG. 15 as follows.

The processor 400 may implement different ultrasonic patterns depending on the event. For example, the processor 400 may allow the ultrasonic elements UT to output ultrasonic patterns identified by using a feedback vibration pattern or an alarm vibration pattern based on the event.

The feedback vibration pattern may be used to perform a haptic function of notifying a user of an event when the event corresponding to a user gesture occurs. For example, the processor 400 may output a first vibration pattern when a tap or click event occurs and may output a second vibration pattern when a flick or drag event occurs. The first vibration pattern may be set as a pattern having vibrations for a shorter time period than the second vibration pattern.

The alarm vibration pattern may be used to perform a function of warning the user of an event when the event corresponding to an abnormal state of the vehicle occurs. For example, the processor 400 may output a third vibration pattern in response to a first alarm event and may output a fourth vibration pattern in response to a second alarm event. The first alarm event may occur when the vehicle's warning light is turned on. The second alarm event may occur in response to the driver's state, such as drowsy driving, or a dangerous situation in front of the vehicle. The processor 400 may control the vibration of the ultrasonic elements UT such that the amplitude of the third vibration pattern is greater than the amplitude of the second vibration pattern.

Figure 16:
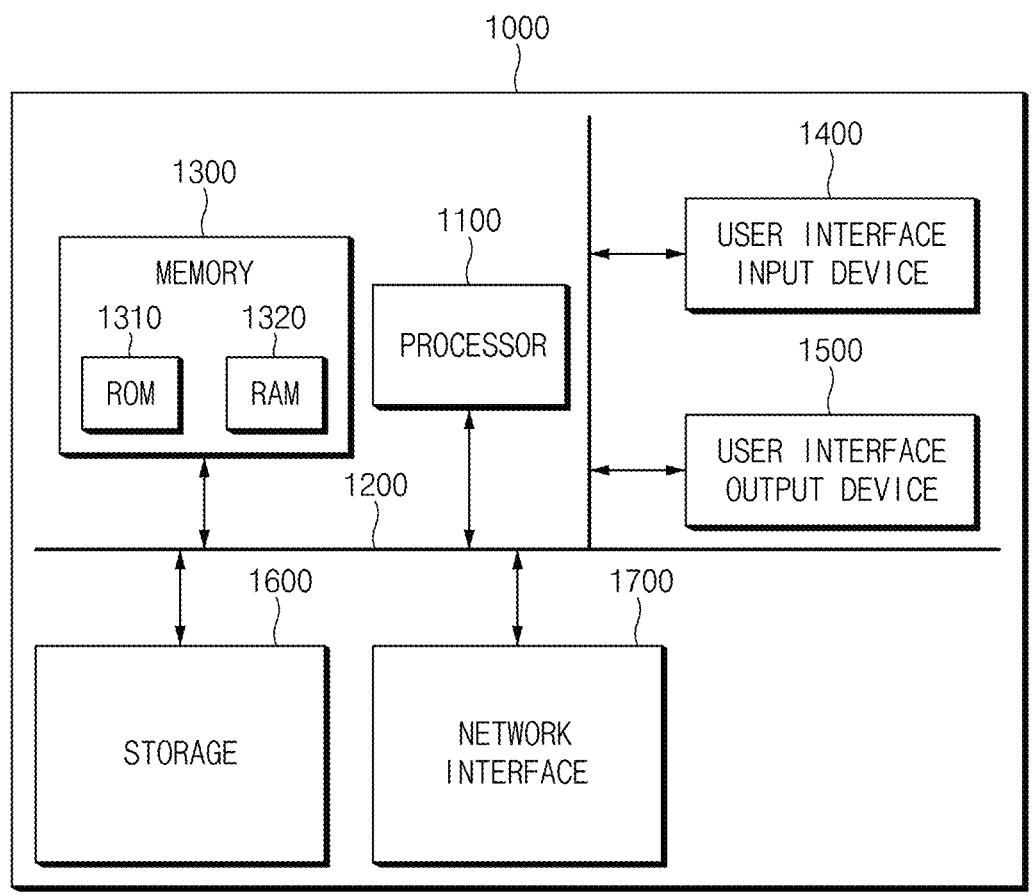
FIG. 16 is a block diagram illustrating a computing system according to an embodiment of the present disclosure.

FIG. 16 illustrates a computing system according to an embodiment of the present disclosure.

Referring to FIG. 16, a computing system 1000 may include at least one processor 1100, a memory 1300, a user interface input device 1400, a user interface output device 1500, a storage 1600, and a network interface 1700, which are connected to each other via a bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) and a random access memory (RAM).

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM).

The storage medium may be coupled to the processor 1100. The processor 1100 may read out information from the storage medium and may write information in the storage medium. Alternatively, the storage medium may be integrated with the processor 1100. The processor and storage medium may be implemented with an application specific integrated circuit (ASIC). The ASIC may be provided in a user terminal. Alternatively, the processor and storage medium may be implemented with separate components in the user terminal.

The above description is merely an example of the technical idea of the present disclosure, and various modifications and modifications may be made by one having ordinary skill in the art without departing from the essential characteristic of the present disclosure.

Accordingly, embodiments of the present disclosure are not intended to limit but to explain the technical idea of the present disclosure, and the scope and spirit of the present disclosure is not limited by the above embodiments. The scope of protection of the present disclosure should be construed by the attached claims, and all equivalents thereof should be construed as being included within the scope of the present disclosure.

According to an embodiment of the present disclosure, a user may easily identify a user interface area even without visual inspection by generating sound pressure having a specific level or more in a non-contact user interface area.

Moreover, according to an embodiment of the present disclosure, sound pressure having a specific level may be generated by using the small number of ultrasonic elements, by concentrating a focusing area of ultrasonic elements.

Furthermore, according to an embodiment of the present disclosure, a user input may be notified to the user by controlling the vibration of ultrasonic elements with a feedback pattern in response to an event entered by the user.

Besides, according to an embodiment of the present disclosure, a warning situation may be notified to the user by controlling the vibration of ultrasonic elements with an alarm pattern in response to warning situations based on a vehicle state.

Besides, a variety of effects directly or indirectly understood through the specification may be provided.

Hereinabove, although the present disclosure has been described with reference to embodiments and the accompanying drawings, the present disclosure is not limited thereto but may be variously modified and altered by those having ordinary skill in the art to which the present disclosure pertains without departing from the spirit and scope of the present disclosure claimed in the following claims.

What is claimed is:

1. A tactile ultrasonic device comprising:
   a plurality of ultrasonic elements including a first ultrasonic element and a second ultrasonic element, wherein beam axes of the first ultrasonic element and second ultrasonic element are not parallel to each other; and
   a processor configured to control vibrations of the plurality of ultrasonic elements,
   wherein a first focus of the first ultrasonic element and a second focus of the second ultrasonic element are formed within a specific range of a tactile sensing area,
   wherein the plurality of ultrasonic elements include:
      an arbitrary reference ultrasonic element;
      a first adjacent ultrasonic element adjacent to the arbitrary reference ultrasonic element; and
      a second adjacent ultrasonic element adjacent to the arbitrary reference ultrasonic element; and
   wherein an interval between the arbitrary reference ultrasonic element and the first adjacent ultrasonic element is set to be different from an interval between the arbitrary reference ultrasonic element and the second adjacent ultrasonic element, and
   wherein a size of the first adjacent ultrasonic element and a size of the second adjacent ultrasonic element are same.

2. The tactile ultrasonic device of claim 1, wherein an interval between the first ultrasonic element and the second ultrasonic element is greater than a diameter of the tactile sensing area.

3. The tactile ultrasonic device of claim 1, wherein the first ultrasonic element and second ultrasonic element are placed to transmit ultrasonic waves in an inside direction of a base plate, and
   at least a partial area of the base plate is curved.

4. The tactile ultrasonic device of claim 3, wherein the base plate is in a ring band shape having a cross section in a tapered shape.

5. The tactile ultrasonic device of claim 1, wherein the plurality of ultrasonic elements are arranged at regular intervals.

6. The tactile ultrasonic device of claim 1, wherein the plurality of ultrasonic elements are randomly arranged.

7. The tactile ultrasonic device of claim 6, wherein focal lengths of the plurality of ultrasonic elements are the same as each other.

8. The tactile ultrasonic device of claim 1, wherein an interval between any pair of ultrasonic elements among the plurality of ultrasonic elements is set to be smaller than a wavelength of each of the plurality of ultrasonic elements.

9. Tactile ultrasonic device of claim 1, wherein the tactile sensing area includes a first tactile sensing area and a second tactile sensing area, which are formed by time division.

10. The tactile ultrasonic device of claim 9, further comprising:
    a camera configured to capture an image of the tactile sensing area,
    wherein the processor is configured to:
       determine a gesture of a user in the tactile sensing area based on the image of the tactile sensing area; and
       perform a predetermined specific function in response to the gesture of the user.

11. The tactile ultrasonic device of claim 10, wherein the processor is configured to:

perform the predetermined specific function differently according to an area where the gesture of the user is detected.

12. The tactile ultrasonic device of claim 10, wherein the processor is configured to:
control vibrations of the plurality of ultrasonic elements such that sound pressure of the first tactile sensing area is different from sound pressure of the second tactile sensing area.

13. The tactile ultrasonic device of claim 10, wherein the processor is configured to:
vibrate the plurality of ultrasonic elements according to a predetermined feedback vibration pattern to provide a notification that the predetermined specific function is performed, after performing the predetermined specific function.

14. The tactile ultrasonic device of claim 13, wherein the processor is configured to:
perform the predetermined specific function based on the gesture of the user located in the first tactile sensing area; and
control the plurality of ultrasonic elements such that the second tactile sensing area vibrates in a predetermined feedback vibration pattern, in response to performing the predetermined specific function.

15. The tactile ultrasonic device of claim 13, wherein the processor is configured to:
perform the predetermined specific function based on the gesture of the user located in the first tactile sensing area; and
control vibrations of the plurality of ultrasonic elements such that a predetermined warning vibration pattern is formed in the second tactile sensing area, in response to a warning event of a vehicle.

16. A method for processing a user input by using a tactile ultrasonic device, the method comprising:
outputting, by a plurality of ultrasonic elements including a first ultrasonic element and a second ultrasonic element arranged, predetermined sound pressure to a tactile sensing area having a diameter smaller than an interval between the first ultrasonic element and the second ultrasonic elements, wherein beam axes of the first ultrasonic element and the second ultrasonic element are not parallel to each other;
capturing, by a camera, an image of the tactile sensing area;
determining, by a processor, a gesture of a user in the tactile sensing area based on the image of the tactile sensing area; and
performing, by the processor, a predetermined specific function based on the gesture of the user,
wherein the plurality of ultrasonic elements include:
an arbitrary reference ultrasonic element;
a first adjacent ultrasonic element adjacent to the arbitrary reference ultrasonic element; and
a second adjacent ultrasonic element adjacent to the arbitrary reference ultrasonic element; and
wherein an interval between the arbitrary reference ultrasonic element and the first adjacent ultrasonic element is set to be different from an interval between the arbitrary reference ultrasonic element and the second adjacent ultrasonic element, and
wherein a size of the first adjacent ultrasonic element and a size of the second adjacent ultrasonic element are same.

17. The method of claim 16, wherein the tactile sensing area includes a first tactile sensing area and a second tactile sensing area, which are formed by time division, and wherein outputting the predetermined sound pressure to the tactile sensing area includes:
controlling vibrations of the plurality of ultrasonic elements such that focuses of the first ultrasonic element and the second ultrasonic element are formed in the first tactile sensing area, during a first time period; and
controlling the vibrations of the plurality of ultrasonic elements such that focuses of the first ultrasonic element and the second ultrasonic element are formed in the second tactile sensing area, during a second time period that does not overlap the first time period.

18. The method of claim 17, wherein performing the predetermined specific function further includes:
determining the gesture of the user in only the first tactile sensing area; and
controlling, by the processor, the vibrations of the plurality of ultrasonic elements such that a predetermined feedback vibration pattern is formed in the second tactile sensing area, in response to performing the predetermined specific function.

19. The method of claim 17, wherein performing the predetermined specific function further includes:
determining the gesture of the user in only the first tactile sensing area; and
controlling, by the processor, the vibrations of the plurality of ultrasonic elements such that a predetermined alarm vibration pattern is formed in the second tactile sensing area, in response to a warning event of a vehicle.

* * * * *